US012646304B2

(12) United States Patent
Tilley

(10) Patent No.: US 12,646,304 B2
(45) Date of Patent: Jun. 2, 2026

(54) SYSTEM AND METHOD FOR SELECTING A DIMENSIONING FUNCTION AND DIMENSIONING AN OBJECT

(71) Applicant: ZEBRA TECHNOLOGIES CORPORATION, Lincolnshire, IL (US)

(72) Inventor: Patrick B. Tilley, Coram, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 496 days.

(21) Appl. No.: 17/730,844

(22) Filed: Apr. 27, 2022

(65) Prior Publication Data

US 2023/0351738 A1 Nov. 2, 2023

(51) Int. Cl.
*G06V 10/80* (2022.01)
*G06T 7/50* (2017.01)

(52) U.S. Cl.
CPC .............. *G06V 10/806* (2022.01); *G06T 7/50* (2017.01)

(58) Field of Classification Search
CPC ........ G06V 10/806; G06V 20/64; G06T 7/50; G06T 7/62; G01B 11/00; G01F 25/0084
See application file for complete search history.

(56) References Cited

U.S. PATENT DOCUMENTS

| | | | |
|---|---|---|---|
| 10,679,046 B1 | 6/2020 | Black | |
| 11,473,899 B2 | 10/2022 | Tilley et al. | |
| 11,669,988 B1 | 6/2023 | Miller | |
| 2012/0262726 A1 | 10/2012 | Nemoto et al. | |
| 2014/0104416 A1 | 4/2014 | Giordano et al. | |
| 2015/0176987 A1 | 6/2015 | Thimirachandra | |
| 2015/0213647 A1 | 7/2015 | Laffargue et al. | |
| 2016/0370220 A1* | 12/2016 | Ackley | G01F 25/0084 |
| 2017/0016714 A1* | 1/2017 | Laffargue | G06F 3/0484 |
| 2017/0264880 A1 | 9/2017 | Zolotov | |
| 2018/0106596 A1 | 4/2018 | Ackley et al. | |
| 2018/0137642 A1 | 5/2018 | Malisiewicz | |
| 2019/0037198 A1 | 1/2019 | Rajak et al. | |

(Continued)

FOREIGN PATENT DOCUMENTS

| | | |
|---|---|---|
| JP | 1991194410 | 8/1991 |
| JP | 1999271027 | 10/1999 |

OTHER PUBLICATIONS

Novelty Search Report for Belgian Patent Application No. 202305334 mailed on Nov. 28, 2023.

(Continued)

*Primary Examiner* — Stephen R Koziol
*Assistant Examiner* — Michael Kim Maiden

(57) ABSTRACT

An example dimensioning device includes: a sensor to capture data representing an object; a memory configured to store: a first dimensioning function and criteria associated with the first dimensioning function; and a default dimensioning function; and a processor interconnected with the sensor and the memory, the processor configured to: in response to a dimensioning request to dimension the object, obtain the data representing the object from the sensor; select, from the first dimensioning function and the default dimensioning function, a designated dimensioning function based on the data and the criteria; call the designated dimensioning function to obtain dimensions of the object; and output the dimensions of the object.

26 Claims, 7 Drawing Sheets

(56) References Cited

U.S. PATENT DOCUMENTS

| | | |
|---|---|---|
| 2019/0339057 A1 | 11/2019 | Laffargue et al. |
| 2021/0116232 A1 | 4/2021 | Epshteyn |
| 2021/0343035 A1 | 11/2021 | Liyanaarachchi |
| 2021/0372771 A1 | 12/2021 | Tilley et al. |
| 2023/0056676 A1* | 2/2023 | Thrimawithana ....... G06T 7/194 |

OTHER PUBLICATIONS

International Search Report and Written Opinion for International Application No. PCT/US2023/19076 mailed on Jul. 11, 2023.
International Search Report and Written Opinion for International Application No. PCT/US2021/033725 mailed on Sep. 9, 2021.
U.S. Appl. No. 18/196,052, filed May 11, 2023.
Japanese Office Action for Japanese patent application No. 2024-563301 mailed on Oct. 1, 2025.
Song, Mofei. "A personalized active method for 4D shape classification." The Visual Computer 37.3 (2021): 497-514. (Year: 2021).

\* cited by examiner

100

300

<u>305</u>
Receive dimensioning request

<u>310</u>
Select designated
dimensioning function

<u>315</u>
Call designated dimensioning
function

<u>320</u>
Output dimensions

400

405
Obtain object data

410
Select candidate function

415
Retrieve criteria for candidate function

420
Object data satisfies criteria?

No

430
Additional functions?

Yes

Yes

425
Select candidate as designated dimensioning function

No

435
Select default as designated dimensioning function

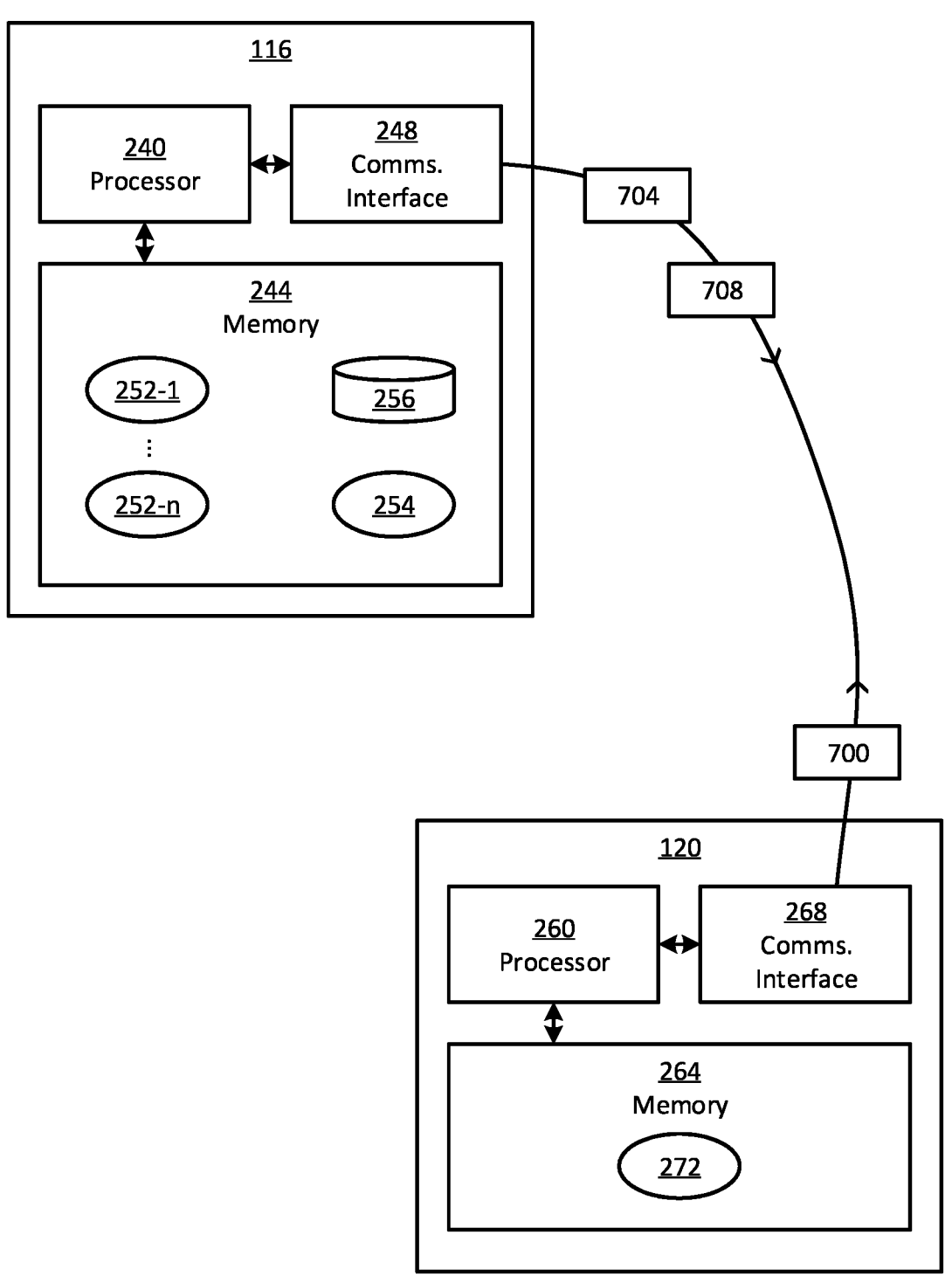
FIG. 7

SYSTEM AND METHOD FOR SELECTING A DIMENSIONING FUNCTION AND DIMENSIONING AN OBJECT

BACKGROUND

Objects such as freight and parcels may need to be dimensioned for example prior to shipping or for storage. Different shapes and sizes of objects may be optimally dimensioned by different dimensioning functions. Additionally, it may be preferable to use a weights & measures legal-for-trade certified dimensioning function which can provide a certification indication as to the accuracy of the resulting dimensions for billing purposes. In other cases, the object to be object or the environment may not fit the criteria for using a certified dimensioning function. It may be difficult for a human operator to make a judgement of the object fitting into one category or another to select an appropriate dimensioning function, and errors in categorization may result in inadmissible dimensioning results, thus requiring additional time and computation to redo the dimensioning operation. Different regulatory agencies, such as NTEP, Measurement Canada, or OIML feature unique rules for certification, further complicating the assessment of selecting an appropriate dimensioning function.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

FIG. 7 is a schematic diagram of another example performance of block 315 of the method of FIG. 3.

Figure 1:
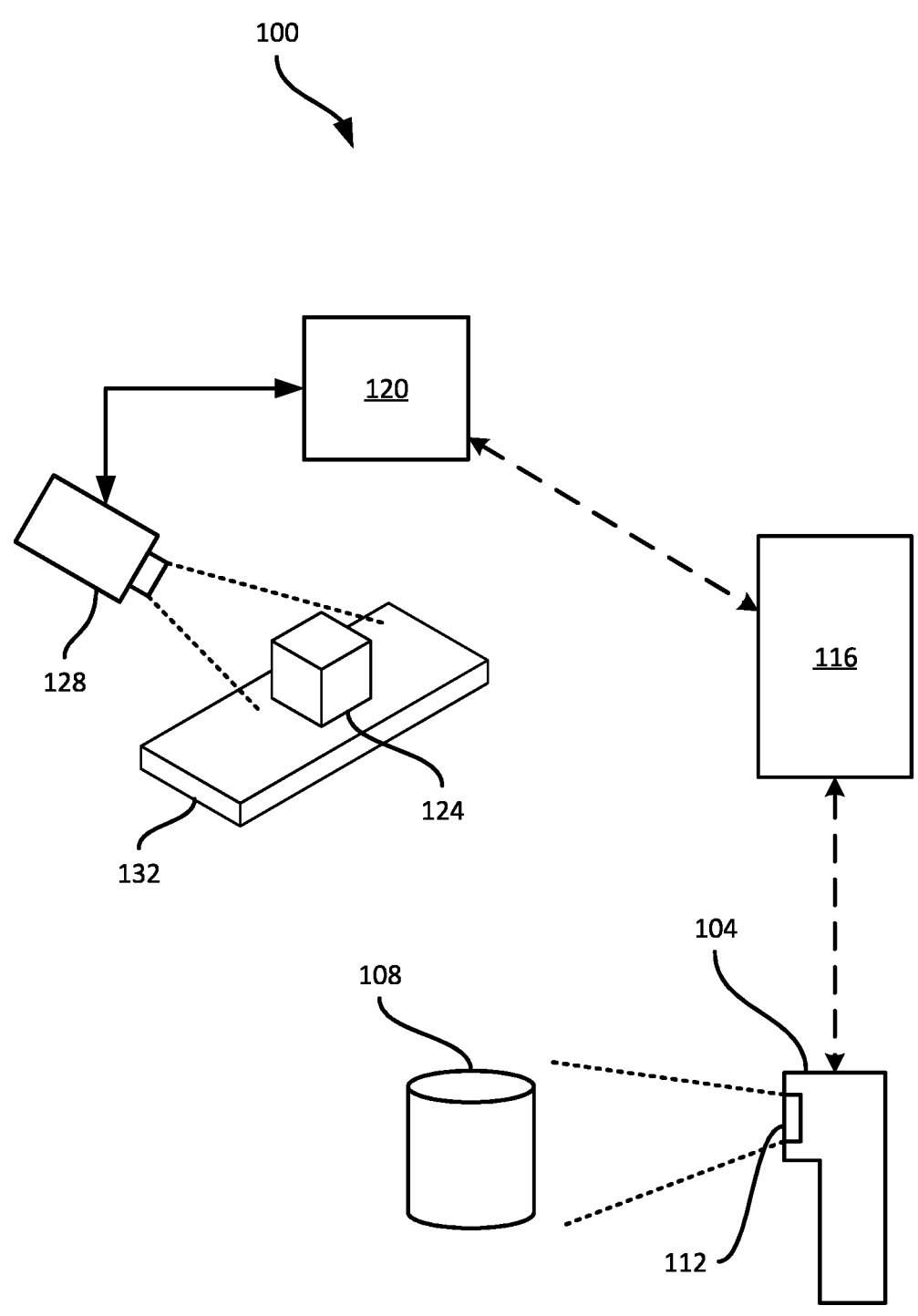
FIG. 1 is a schematic diagram of a system for selecting dimensioning function and dimensioning an object.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Examples disclosed herein are directed to a dimensioning device comprising: a sensor to capture data representing an object; a memory configured to store: a first dimensioning function and criteria associated with the first dimensioning function; and a default dimensioning function; and a processor interconnected with the sensor and the memory, the processor configured to: in response to a dimensioning request to dimension the object, obtain the data representing the object from the sensor; select, from the first dimensioning function and the default dimensioning function, a designated dimensioning function based on the data and the criteria; call the designated dimensioning function to obtain dimensions of the object; and output the dimensions of the object.

Additional examples disclosed herein are directed to a dimensioning system comprising: a server configured to store: a first dimensioning function and criteria associated with the first dimensioning function; and a default dimensioning function; a computing device including a processor, the processor configured to: in response to a dimensioning request to dimension an object, obtain data representing the object; select, from the first dimensioning function and the default dimensioning function, a designated dimensioning function based on the data and the criteria; call the designated dimensioning function to obtain dimensions of the object; and output the dimensions of the object.

Additional examples disclosed herein are directed to a method comprising: storing a first dimensioning function and criteria associated with the first dimensioning function; storing a default dimensioning function; in response to a dimensioning request to dimension an object, obtain data representing the object; selecting, from the first dimensioning function and the default dimensioning function, a designated dimensioning function based on the data and the criteria; calling the designated dimensioning function to obtain dimensions of the object; and outputting the dimensions of the object.

FIG. 1 depicts a system 100 for selecting a dimensioning function and dimensioning objects in accordance with the teachings of this disclosure. The system 100 includes a mobile computing device 104 (also referred to herein as dimensioning device 104 or simply the device 104) configured to dimension an object 108 according to a selected dimensioning function. The device 104 includes an integrated sensor, or set of sensors, 112, such as image sensors (e.g., optical cameras, infrared sensors, etc.), depth sensors (e.g., LIDAR, etc.), ambient light sensors, proximity sensors, temperature sensors, and the like to capture object data representing the object 108 and environmental factors surrounding the object 108 to allow the device 104 to select a designated dimensioning function and to dimension the object 108.

The device 104 may be in communication with a server 116 via a communication link, illustrated in the present example as including wireless links. For example, the link may be provided by a wireless local area network (WLAN) deployed by one or more access points (not shown). In other examples, the server 116 is located remotely from the device 104 and the link may therefore include one or more wide-area networks such as the Internet, mobile networks, and the like. The server 116 may be any suitable server environment, including a plurality of cooperating servers operating, for example in a cloud-based environment. Secure communication links may be employed to ensure software sealing to reduce opportunities to compromise certified functions.

In some examples, the system 100 may include a fixed computing device 120 configured to dimension an object 124 according to a selected dimensioning function. The fixed computing device 120 is in communication with sensors 128, such as image sensors (e.g., optical cameras, infrared sensors, etc.), depth sensors (e.g., LIDAR, etc.), ambient light sensors, proximity sensors, temperature sensors, and the like to capture object data representing the object 124. The fixed computing device 120 may also be in communication with the server 116.

The system 100 is generally deployed to dimension objects, such as the objects 108 and 124. In particular, the system 100 may maintain a plurality of dimensioning functions, each having a different algorithm for dimensioning the objects 108 and 124. In particular, the dimensioning functions may dimension the objects 108 and 124 with varying accuracy. For example, some of the dimensioning functions may be certified by a governing organization as providing output dimensions above a specified accuracy (or below a maximum permissible error). For example, the dimensioning functions may be weights & measures legal-for-trade in one or more regulatory domains. Additionally, the dimensioning functions may be associated with different sets of criteria for which the dimensioning function can produce a result, or can produce a result with the specified accuracy. Accordingly, the system 100 may store criteria associated with each of the dimensioning functions. The system 100, and in particular, the mobile computing device 104 and/or the fixed computing device 120 may select a designated dimensioning function to call to dimension the objects 108 and 124, respectively, based on the criteria and detected data representing the object, including the environment of the object.

The mobile computing device 104 and the fixed computing device 120 may be employed in different contexts to select a designated dimensioning function and to dimension a target object. For example, the mobile computing device 104 may be employed by a user to dimension objects which are heavy or irregularly shaped, are located in tight spaces, or under other conditions in which mobility of the device 104 is advantageous. The fixed computing device 120 may be employed in more structured contexts and may have a fixed field based on the sensors 128. For example, the fixed computing device 120 may be employed to dimension objects which are moved along a conveyor belt 132 through the field of the sensors 128. This does not preclude the use of a mobile device, such as the device 104 in this case as long as criteria can be met.

Operationally, the mobile computing device 104 and the fixed computing device 120 function similarly to select a designated dimensioning function and use the associated sensors 112 and 128, respectively, to dimension the objects 108 and 124, respectively. In particular, the selection of a designated dimensioning function may be based on the criteria for the dimensioning functions and detected object data.

Figure 2:
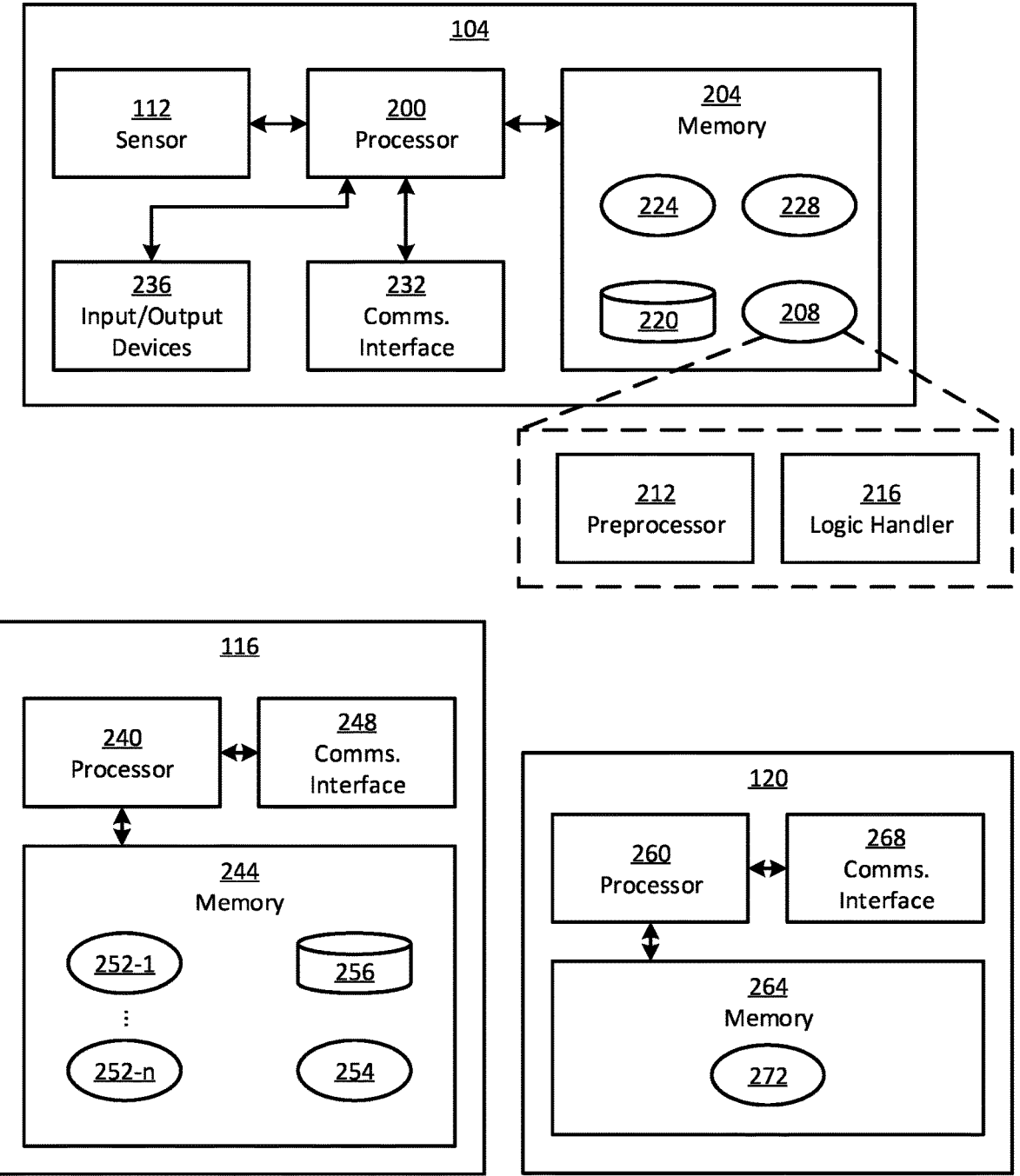
FIG. 2 is a block diagram of certain internal hardware components of certain devices of FIG. 1.

Turning now to FIG. 2, certain internal components of the mobile computing device 104, the server 116 and the fixed computing device 120 are illustrated.

The device 104 includes a processor 200 interconnected with a non-transitory computer-readable storage medium, such as a memory 204. The memory 204 includes a combination of volatile memory (e.g. Random Access Memory or RAM) and non-volatile memory (e.g. read only memory or ROM, Electrically Erasable Programmable Read Only Memory or EEPROM, flash memory). The processor 200 and the memory 204 may each comprise one or more integrated circuits.

The memory 204 stores computer-readable instructions for execution by the processor 200. In particular, the memory 204 stores an application 208 which, when executed by the processor 200, configures the processor 200 to perform various functions discussed below in greater detail and related to the selection of a designated dimensioning function and dimensioning operation by the device 104. In particular, in the present example, the application 208 includes a preprocessor 212 and a logic handler 216.

The preprocessor 212 is a module of the application 208 configured to analyze the criteria for the dimensioning functions and the detected object data to make a selection of a designated dimensioning function. The logic handler 216 is a module of the application 208 configured to handle business logic to make appropriate requests to the preprocessor 212 for a suitable designated dimensioning function. For example, the logic handler 216 may extract parameters of dimensioning requests to determine whether the designated dimensioning function is to be certified, or to perform other pre- or post-processing associated with the dimensioning operation. As used herein, it will be understood that the preprocessor 212 and the logic handler 216 may be said to perform various actions via execution of the instructions stored therein by the processor 200.

In other examples, the application 208 (i.e., including the preprocessor 212 and the logic handler 216) may also be implemented as a suite of distinct applications.

Those skilled in the art will appreciate that the functionality implemented by the processor 200 may also be implemented by one or more specially designed hardware and firmware components, such as a field-programmable gate array (FPGAs), application-specific integrated circuits (ASICs) and the like in other embodiments. In an embodiment, the processor 200 may be, respectively, a special purpose processor which may be implemented via dedicated logic circuitry of an ASIC, an FPGA, or the like in order to enhance the processing speed of the operations discussed herein.

The memory 204 also stores a repository 220 storing rules and data for the selection of the designated dimensioning function. For example, the repository 220 may store, for each dimensioning function, criteria or a set of conditions associated with the dimensioning function. The criteria for a given dimensioning function may represent parameters for which the dimensioning function is optimized and provides the most accurate results. For certified dimensioning functions, the criteria may represent the parameters for which the resulting output dimensions can be certified.

The criteria may include parameters related to the characteristics of the object itself, the environment of the object, the usage of the dimensioning device 104 and/or the sensors used to obtain the object data, the confidence level of the dimensioning function, and the like. The criteria may be defined by exclusions (i.e., conditions for which the given dimensioning function should not be used), inclusions, thresholds, and other suitable criteria.

The object parameters in the criteria may be defined based on the shape, color and reflectivity, object surface characteristics, and the like. For example, certain dimensioning functions may be optimized for or certified for specific shapes of target objects, such as cuboidal objects. Accordingly, if any irregular shapes or protrusions are detected, the object parameters may not be satisfied. Similarly, specific colors and reflectivity attributes, or surface characteristics such as transparency, roughness or bumpiness may be listed as exclusions for the object parameters.

The environmental parameters may be defined based on lighting, supporting surface characteristics, background characteristics, singulation, and the like. For example, some sensors used for certain dimensioning functions may not work well in sunlight or in the dark, and hence the environmental parameters may specify a target range of lighting levels as detected by another sensor capable of detecting compliant lighting conditions. Some dimensioning functions may also require a visible or flat supporting surface, sufficient space around the target object or have a maximum complexity of the background, or the like. The environmental parameters may therefor specify that such environmental considerations are present or detected for use of the corresponding dimensioning functions.

The usage parameters may be defined based on the operation of the device 104 and/or the sensors capturing the object data for evaluation against the criteria. For example, some dimensioning functions may require fixed operation of the sensors capturing the object data. Accordingly, the usage parameters may specify an exclusion if motion or varying orientations are detected. Other dimensioning functions may include, as part of their algorithms, motion and/or orientation compensation for certain ranges of motion or orientation variation and hence the usage parameters may specify threshold amounts of motion or orientation variation.

The confidence parameters may be confidence metrics from the dimensioning function itself. For example, during or after execution of the dimensioning function, the dimensioning function may produce confidence levels in the computed output dimensions.

The memory 204 may additionally store at least two dimensioning functions as discrete applications. In the present example, the memory 204 stores a first dimensioning function 224 and a default dimensioning function 228.

The first dimensioning function 224 may be, for example, a certified dimensioning function. In particular, the certification of dimensioning functions may require that the dimensioning functions are software-sealed and tamper-resistant, and hence the corresponding applications implementing the functions may be stored in the memory 204 as discrete applications. The first dimensioning function 224 may additionally have associated criteria stored at the repository 220.

The memory 204 may additionally store further dimensioning applications (not shown) implementing further dimensioning functions. The memory 204, and particularly the repository 220 may additionally store the associated criteria for the further dimensioning functions. In relation to the first dimensioning function 224, the associated criteria may be firm requirements for certification of the resulting dimensions. However, in other examples, the criteria associated with a dimensioning function may be softer targets for which the dimensioning function application is optimized.

The default dimensioning function 228 may have no criteria associated with it. In some examples, the default dimensioning function 228 may be an instruction to be output to perform a manual measurement of the target object. In other examples, the default dimensioning function 228 may be substantially the same as a certified dimensioning function without the certification of accuracy of the resulting dimensions. Other default dimensioning functions are also contemplated.

In the present example, the device 104 is illustrated as storing applications implementing the dimensioning functions 224 and 228, however in other examples, the dimensioning functions may be stored remotely, such as applications at the server 116, and may be accessed or called by the device 104.

The device 104 also includes a communications interface 232 enabling the device 104 to exchange data with other computing devices such as the server 116. The communications interface 232 is interconnected with the processor 200 and includes suitable hardware (e.g. transmitters, receivers, network interface controllers and the like) allowing the device 104 to communicate with other computing devices—such as the server 116. The specific components of the communications interface 232 are selected based on the type of network or other links that the device 104 is to communicate over. The device 104 can be configured, for example, to communicate with the server 116 using the communications interface 232 to send and receive data from the server 116, to call dimensioning functions stored at the server 116, or the like.

The device 104 may further include one or more input and/or output devices 236. The input devices may include one or more buttons, keypads, touch-sensitive display screens or the like for receiving input from an operator, for example to initiate a dimensioning operation. The output devices may include one or more display screens, sound generators, vibrators, or the like for providing output or feedback to an operator, for example to output the determined dimensions of a target object.

The server 116 includes a processor 240 interconnected with a memory 244 and a communications interface 248. The memory 244 may store further dimensioning functions 252-1 to 252-n (referred to herein generically as a dimensioning function 252 and collectively as dimensioning functions 252), as well as a selection application 254 and a repository 256. The dimensioning functions 252 are similar to the dimensioning functions 224 and 228 and may be associated with respective sets of criteria stored in the repository 256. The selection application 254 may configure the processor 240 to perform various functions discussed below in greater detail and related to the selection of a designated dimensioning function from the dimensioning functions 252 by the server 116.

The computing device 120 includes a processor 260 interconnected with a memory 264 and a communications interface 268. The memory 264 stores an application 272 which, when executed, causes the processor 260 to perform various functions discussed below and related to the dimensioning operation by the computing device 120. The application 272 may be similar to the application 208 and include a preprocessor and a logic handler (not shown). In the present example, the computing device 120 may not store dimensioning functions, but rather may cooperate with the server 116 to select and call a designated dimensioning function from the dimensioning functions 252 as described herein.

Figure 3:
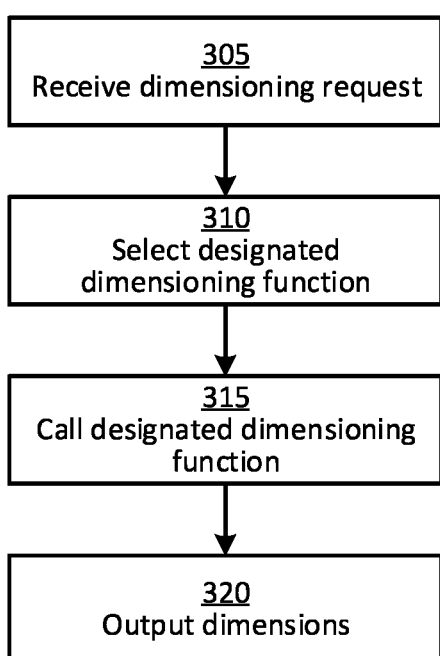
FIG. 3 is a flowchart of a method for dimensioning an object.

Turning now to FIG. 3, the functionality implemented by the device 104 will be discussed in greater detail. FIG. 3 illustrates a method 300 of dimensioning a target object. The method 300 will be discussed in conjunction with its performance in the system 100, and particularly by the device 104, via execution of the application 208 to dimension the object 108. In particular, the method 300 will be described with reference to the components of FIGS. 1 and 2. In other examples, the method 300 may be performed in whole or in part by other suitable devices or systems, such as the computing device 120 to dimension the object 124, or by the server 116.

The method 300 is initiated at block 305, where the device 104 receives a dimensioning request. The dimensioning request may be generated, for example in response to input from a user of the device 104. In particular, the dimensioning request may be initially processed by the logic handler 216.

At block 310, in response to the dimensioning request, the device 104 selects a designated dimensioning function. In particular, rather than immediately calling a dimensioning application, the logic handler 216 may call the preprocessor 212 to select a designated dimensioning function based on the criteria for available dimensioning functions and object data for the target object.

Figure 4:
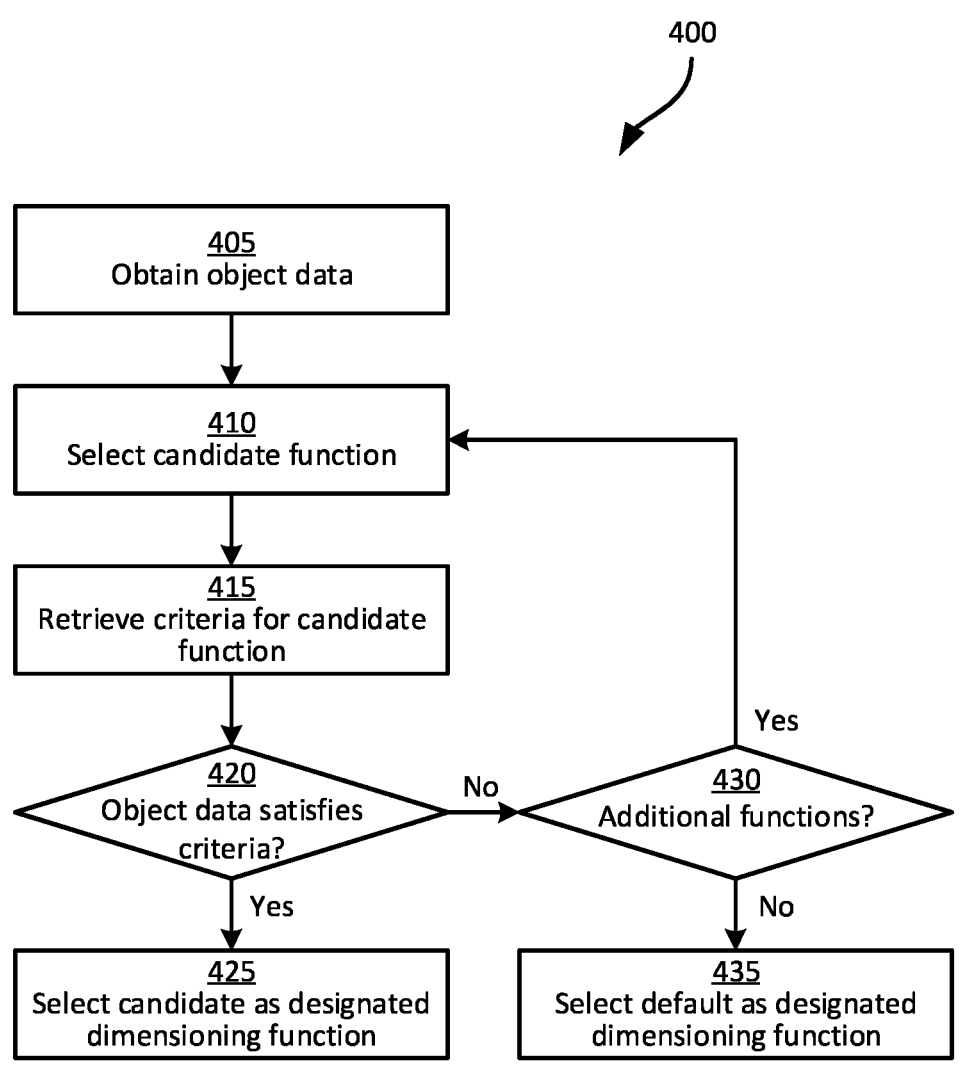
FIG. 4 is a flowchart of an example method of selecting a dimensioning function at block 310 of the method of FIG. 3.

For example, referring to FIG. 4, a flowchart of an example method 400 of selecting a designated dimensioning function is depicted.

At block 405, the device 104, and in particular the preprocessor 212, obtains object data representing the object 108. The object data may include features of the object 108 itself, such as surface, color, shape, and the like, as well as environmental factors for the object 108, such as lighting and background conditions. For example, the preprocessor 212 may control the sensor 112 to capture the object data.

In some examples, prior to proceeding, the preprocessor 212 may apply an error detection algorithm to verify that the object 108 is present and was captured in the object data.

At block 410, selects a candidate function from the available dimensioning functions. In particular, the available dimensioning functions may include the first dimensioning function 224, any further dimensioning functions, and the default dimensioning function. The preprocessor 212 may select, as a candidate function, one of the dimensioning functions which has not yet been evaluated for example, by iterating through the dimensioning functions sequentially. For example, the dimensioning functions may be sequenced in order of accuracy of the results.

In other examples, the preprocessor 212 may receive, from the logic handler 216, an indication that a certified dimensioning function is preferred or required. In such examples, the preprocessor 212 may select a certified dimensioning function, such as the first dimensioning function 224, as the candidate function. In still further examples, other criteria or prioritization schemes for selecting candidate functions may be specified by the logic handler 216.

At block 415, the preprocessor 212 retrieves the criteria associated with the candidate function selected at block 405 from the repository 220.

At block 420, the preprocessor 212 determines whether the object data obtained at block 405 satisfies the criteria retrieved at block 415. In some examples, the determination at block 420 by the preprocessor 212 may implement one or more artificial intelligence (AI) algorithms. For example, an AI engine may be trained, for a given dimensioning function, based on images of target objects which satisfy the criteria associated with the given dimensioning function. In some examples, multiple AI-based categorizers may be employed. For example, each categorizer may be trained according to different types of criteria. That is, separate categorizers may evaluate object parameters (e.g., shape, color and reflectivity, surface characteristics, and other physical parameters of the object), environmental parameters (e.g., lighting, supporting surface characteristics, background, singulation, and the like), usage parameters (e.g., motion and orientation, fixed versus mobile operation, and the like), and confidence parameters (e.g., confidence metrics from the dimensioning function). The categorizers may be trained and operated separately or in parallel. Artificial intelligence may be used to determine if the criteria for specific dimensioning functions has been met. For example, a set of classifiers can be used to determine if an applicable dimensioning function can be chosen. Some classifiers may be simple in nature. For example, a device and algorithm may be certified as legal-for-trade within a specific temperature range, while temperatures outside of that range are excluded. A simple binary classification (in or out-of-range)

can be used to exclude specific dimensioning functions. In particular, the exclusion classifiers can be executed first to avoid more costly computations.

Other decision criteria may be more complex in nature even for simple classification. A computer vision algorithm may be used to determine reflectivity within a captured image. In many cases certain dimensioning functions may exclude specific reflectivity ranges. Once again, a binary classification may be used to determine whether the dimensioning function may be selected.

In still further examples, other classifiers may be trained. For example, determining whether a dimensioning function can be used in an environment where the target object is to be singulated (separated from other objects) may require a significant set of training images. Other situations where a trained classifier can be used include, but are not limited to: object transparency, irregular shape, glare, lighting (including sunlight), sparse point cloud, point cloud holes, and the like. The preprocessor 212 may therefore be configured to determine the applicability of a dimensioning function to allow an appropriate dimensioning function to be selected and called, rather than dimensioning the object itself. The applicability decision can be based upon success criteria such as the ability to meeting certified dimensioning accuracy with various objects and in various environments.

In some examples, the preprocessor 212 may use a bank of classifiers, such as decision trees, and then use an algorithm such as random forest to finalize a decision. In other cases, the preprocessor 212 may use more complex classifiers based on deep learning. These classifiers can be based on open source or purpose-built custom classifiers. Examples of open source platforms are TensorFlow, H2O, Torch, Theano, etc.

Some of the AI-based determinations may be computationally expensive, and accordingly, in some examples, rather than implementing the AI algorithms locally at the device 104 or the device 120, the AI-based determination at block 420 may be outsourced to the server 116. For example, the determination at block 420 may be performed by the processor 240 via execution of the selection application 254. Accordingly, at block 420, the preprocessor 212 (or the equivalent at device 120) may send the object data obtained at block 405 to the server 116 for evaluation against the criteria for the candidate function and receive a determination from the server 116. In further examples, some preliminary evaluations, including both AI-based and deterministic evaluations, of the object data and the criteria may be performed at the device 104 prior to requesting a determination from the server 116.

If the determination at block 420 is affirmative, that is that the object data satisfies the criteria for the candidate function, then the method 400 proceeds to block 425. At block 425, the preprocessor 212 selects the candidate function as the designated dimensioning function.

If the determination at block 420 is negative, that is that the object data does not satisfy the criteria for the candidate function, then the method 400 proceeds to block 430. At block 430, the preprocessor 212 determines if there are additional dimensioning functions to evaluate.

If the determination at block 430 is affirmative, that is that there are additional dimensioning functions to evaluate, then the method 400 returns to block 410 for the preprocessor 212 to select another candidate function for evaluation.

If the determination at block 430 is negative, that is that there are no additional dimensioning functions to evaluate, then the method 400 proceeds to block 435. At block 435, the preprocessor 212 selects the default dimensioning function 228 as the designated dimensioning function.

Returning to FIG. 3, after selecting a designated dimensioning function at block 310, the method 300 proceeds to block 315. At block 315, the device 104 calls the designated dimensioning function.

Figure 5:
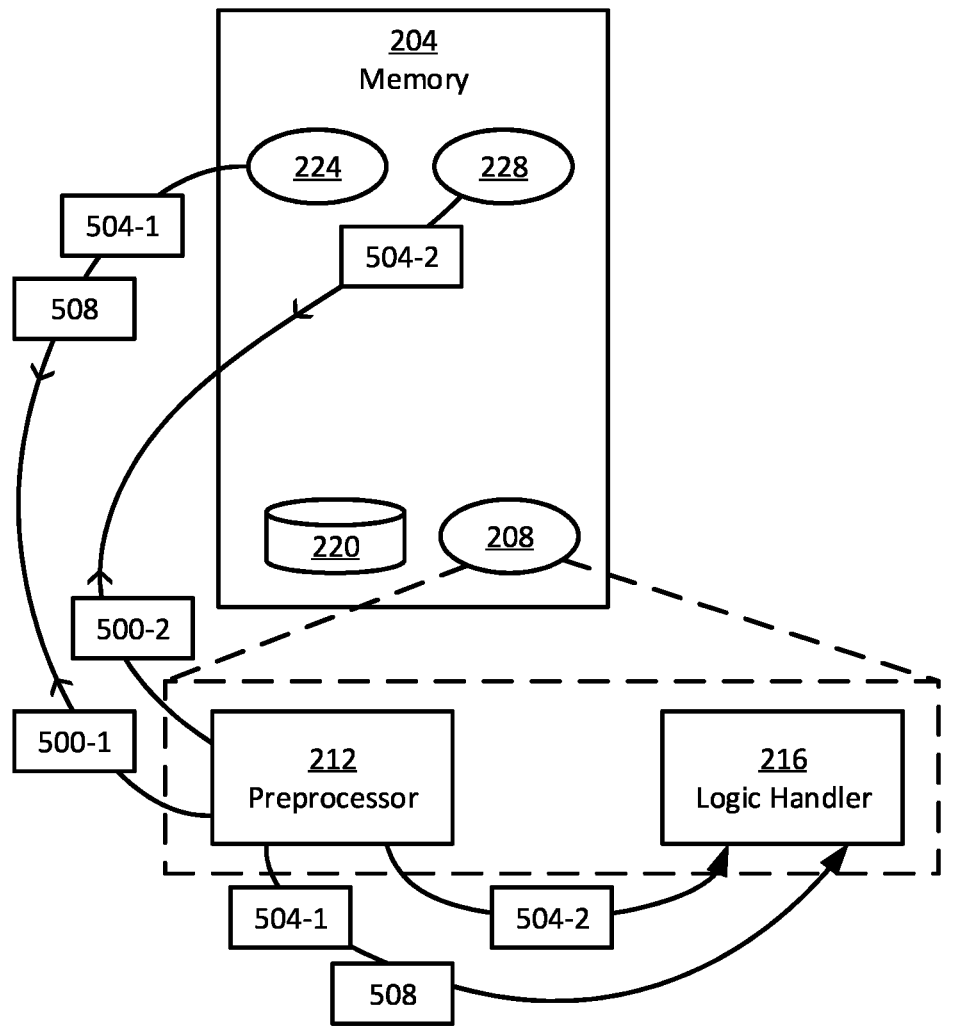
FIG. 5 is a schematic diagram of an example performance of block 315 of the method of FIG. 3.

In some examples, block 315 may be performed by the preprocessor 212. For example, referring to FIG. 5, a schematic diagram of the performance of block 315 by the preprocessor 212 is depicted. According to a first example, the designated dimensioning function may be the first dimensioning function 224. After selecting a designated dimensioning function, the preprocessor 212 may directly make a call 500-1 to the first dimensioning function 224 to cause the processor 200 to execute the first dimensioning function 224. As a result of executing the first dimensioning function 224 by the processor 200, the first dimensioning function 224 produces dimensions 504-1. Additionally, since the first dimensioning function 224 is a certified function, the first dimensioning function 224 also produces a certification indication 508 as to the accuracy of the dimensions 504-1. The preprocessor 212 may then provide the dimensions 504-1 and the certification indication 508 to the logic handler 216.

According to another example, the designated dimensioning function may be the default dimensioning function 228. In this case, after selecting a designated dimensioning function, the preprocessor 212 makes a call 500-2 to the default dimensioning function 228 to cause the processor 200 to execute the default dimensioning function 228. As a result, the default dimensioning function 228 produces dimensions 504-2. Since the default dimensioning function 228 is not certified, no certification indication is generated. The preprocessor 212 may then provide the dimensions 504-2 to the logic handler 216.

Figure 6:
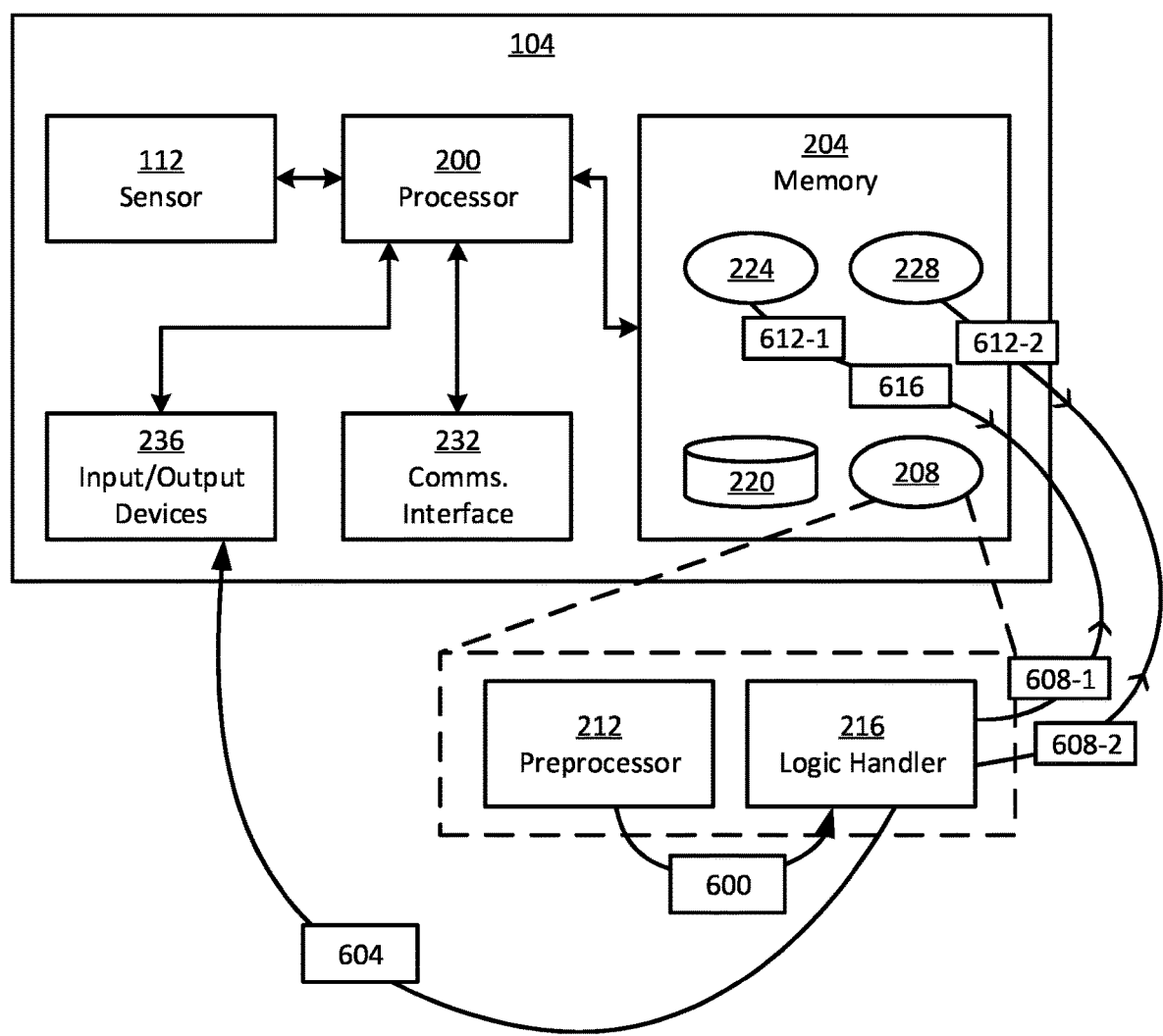
FIG. 6 is a schematic diagram of another example performance of block 315 of the method of FIG. 3.

In other examples, block 315 may be performed by logic handler 216. For example, referring to FIG. 6, a schematic diagram of the performance of block 315 by the logic handler 216 is depicted. After selecting a designated dimensioning function 600, the preprocessor 212 may return the designated dimensioning function 600 to the logic handler 216.

This allows the logic handler 216 to make a determination as to whether to call the designated dimensioning function 600 or elect to use, for example, a manual dimensioning method. For example, if the designated dimensioning function 600 is not certified, but the dimensioning request indicates that a certification is required, then the logic handler 216 may elect to, instead of calling the non-certified designated dimensioning function 600, present instructions 604 at a display of the device 104 for a user to manually measure the dimensions of the object 108. This may allow the device 104 to preserve computational power as a dimensioning function need not be called if an appropriate designated dimensioning function is not available.

If no such issues are present, the logic handler 216 may proceed to make a call 608-1 or 608-2 to the first dimensioning function 224 or the default dimensioning function 228. In particular, the logic handler 216 may similarly cause the processor 200 to execute the designated dimensioning function. As a result of calling the designated dimensioning function 600, the logic handler 216 receives dimensions 612-1 and a certification indication 616 from the first dimensioning function 224 or dimensions 612-2 from the default dimensioning function 228, as applicable.

In other examples, such as when the device 120 is performing the method 300, the designated dimensioning function may be stored externally to the device 120 (e.g., at the server 116. Referring to FIG. 7, a schematic diagram of the execution of block 315 by the device 120 is depicted. After selecting a designated dimensioning function, the device 120 may make a call 700 via the communications interface 268 to the server 116. The call 700 may specify the designated dimensioning function to execute as well as requisite sensor data from the sensors 128 to execute the designated dimensioning function. The server 116, and in particular the processor 240 may then execute the designated dimensioning function (e.g., from the dimensioning functions 252) and return computed dimensions 704 and a certification indication 708, as applicable, to the device 120.

Returning to FIG. 3, and execution of the method 300 by the device 104, at block 320, the logic handler 216 outputs the dimensions and certification indication, as applicable, of the object 108. For example, the dimensions may be displayed at a display of the device 104. In some examples, the dimensions and certification indication may be stored at the repository 220 in association with an identifier of the object 108.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A dimensioning device comprising:
a sensor to capture data representing an object;
a memory configured to store:
a first dimensioning function and criteria associated with the first dimensioning function; and
a default dimensioning function; and
a processor interconnected with the sensor and the memory, the processor configured to:
in response to a dimensioning request to dimension the object, obtain the data representing the object from the sensor;
select, from the first dimensioning function and the default dimensioning function, a designated dimensioning function based on the data and the criteria;
call the designated dimensioning function to obtain dimensions of the object; and
output the dimensions of the object;

wherein the first dimensioning function is optimized to dimension an object having a first set of characteristics; and
wherein the default dimensioning function is optimized to dimension another object having a second set of characteristics different from the first set of characteristics.

2. The dimensioning device of claim 1, wherein to select the designated dimensioning function, the processor is to:
determine whether the object data satisfies the criteria associated with the first dimensioning function; and
when the data satisfies the criteria, select the first dimensioning function as the designated dimensioning function.

3. The dimensioning device of claim 1, wherein the first dimensioning function is certified.

4. The dimensioning device of claim 3, wherein the processor is further to output a certification indication as to an accuracy of the dimensions of the object when the first dimensioning function is selected as the designated dimensioning function.

5. The dimensioning device of claim 1, wherein the processor is to elect to call the designated dimensioning function or use a manual dimensioning method based on the dimensioning request.

6. The dimensioning device of claim 1, wherein the criteria includes one or more of: object parameters, environmental parameters, usage parameters, and confidence parameters.

7. The dimensioning device of claim 1, wherein the processor is to implement an artificial intelligence algorithm to select the designated dimensioning function.

8. The dimensioning device of claim 1, wherein the memory is further configured to store one or more further dimensioning functions and respective further criteria associated with each of the further dimensioning functions; and
wherein the processor is to select the designated dimensioning function from the first dimensioning function, the further dimensioning functions and the default dimensioning function based on the data, the criteria and the further criteria.

9. A dimensioning system comprising:
a server configured to store:
a first dimensioning function and criteria associated with the first dimensioning function; and
a default dimensioning function;
a computing device including a processor, the processor configured to:
in response to a dimensioning request to dimension an object, obtain data representing the object;
select, from the first dimensioning function and the default dimensioning function, a designated dimensioning function based on the data and the criteria;
call the designated dimensioning function to obtain dimensions of the object; and
output the dimensions of the object;
wherein the first dimensioning function is optimized to dimension an object having a first set of characteristics; and
wherein the default dimensioning function is optimized to dimension another object having a second set of characteristics different from the first set of characteristics.

10. The dimensioning system of claim 9, further comprising a sensor to capture the object data representing the object.

11. The dimensioning system of claim 9, wherein to select the designated dimensioning function, the processor is to:

determine whether the data satisfies the criteria associated with the first dimensioning function; and when the data satisfies the criteria, select the first dimensioning function as the designated dimensioning function.

12. The dimensioning system of claim 9, wherein the first dimensioning function is certified.

13. The dimensioning system of claim 12, wherein the processor is further to output a certification indication as to an accuracy of the dimensions of the object when the first dimensioning function is selected as the designated dimensioning function.

14. The dimensioning system of claim 9, wherein to call the designated dimensioning function, the processor is to make a call to the server to execute the designated dimensioning function.

15. The dimensioning system of claim 9, wherein the processor is to elect to call the designated dimensioning function or use a manual dimensioning method based on the dimensioning request.

16. The dimensioning system of claim 9, wherein the criteria includes one or more of object parameters, environmental parameters, usage parameters, and confidence parameters.

17. The dimensioning system of claim 9, wherein the processor is to implement an artificial intelligence algorithm to select the designated dimensioning function.

18. The dimensioning system of claim 9, wherein the server is further configured to store one or more further dimensioning functions and respective further criteria associated with each of the further dimensioning functions; and wherein the processor is to select the designated dimensioning function from the first dimensioning function, the further dimensioning functions and the default dimensioning function based on the data, the criteria and the further criteria.

19. A method comprising:

storing a first dimensioning function and criteria associated with the first dimensioning function;

storing a default dimensioning function;

in response to a dimensioning request to dimension an object, obtain data representing the object;

selecting, from the first dimensioning function and the default dimensioning function, a designated dimensioning function based on the data and the criteria;

calling the designated dimensioning function to obtain dimensions of the object; and outputting the dimensions of the object;

wherein the first dimensioning function is optimized to dimension an object having a first set of characteristics; and wherein the default dimensioning function is optimized to dimension another object having a second set of characteristics different from the first set of characteristics.

20. The method of claim 19, wherein selecting the designated dimensioning function comprises:

determining whether the data satisfies the criteria associated with the first dimensioning function; and when the data satisfies the criteria, selecting the first dimensioning function as the designated dimensioning function.

21. The method of claim 19, wherein the first dimensioning function is certified.

22. The method of claim 21, further comprising outputting a certification indication as to an accuracy of the dimensions of the object when the first dimensioning function is selected as the designated dimensioning function.

23. The method of claim 19, further comprising electing to call the designated dimensioning function or use a manual dimensioning method based on the dimensioning request.

24. The method of claim 19, wherein the criteria includes one or more of: object parameters, environmental parameters, usage parameters, and confidence parameters.

25. The method of claim 19, further comprising implementing an artificial intelligence algorithm to select the designated dimensioning function.

26. The method of claim 19, further comprising:

storing one or more further dimensioning functions and respective further criteria associated with each of the further dimensioning functions; and selecting the designated dimensioning function from the first dimensioning function, the further dimensioning functions and the default dimensioning function based on the data, the criteria and the further criteria.

* * * * *